United States Patent
Jiang et al.

(10) Patent No.: US 12,301,420 B2
(45) Date of Patent: May 13, 2025

(54) UNICAST TO MULTICAST SERVICE REFLECTION IN SD-WAN FABRIC

(71) Applicant: Cisco Technology, Inc., San Jose, CA (US)

(72) Inventors: Yuefeng Jiang, Shanghai (CN); Siwei Wu, Shanghai (CN)

(73) Assignee: Cisco Technology, Inc., San Jose, CA (US)

(*) Notice: Subject to any disclaimer, the term of this patent is extended or adjusted under 35 U.S.C. 154(b) by 267 days.

(21) Appl. No.: 17/982,899

(22) Filed: Nov. 8, 2022

(65) Prior Publication Data

US 2024/0056357 A1 Feb. 15, 2024

Related U.S. Application Data

(60) Provisional application No. 63/397,096, filed on Aug. 11, 2022.

(51) Int. Cl.
*H04L 41/0894* (2022.01)
*H04L 12/18* (2006.01)
*H04L 69/22* (2022.01)

(52) U.S. Cl.
CPC .......... *H04L 41/0894* (2022.05); *H04L 12/18* (2013.01); *H04L 69/22* (2013.01)

(58) Field of Classification Search
None
See application file for complete search history.

(56) References Cited

U.S. PATENT DOCUMENTS

| 10,432,425 | B2* | 10/2019 | Wang | H04L 12/4625 |
| 2014/0259012 | A1* | 9/2014 | Nandlall | G06F 9/45558 718/1 |
| 2018/0102965 | A1 | 4/2018 | Hari et al. | |

(Continued)

FOREIGN PATENT DOCUMENTS

| CN | 107948064 A | 4/2018 |
| EP | 3799371 B1 | 8/2023 |
| WO | 2019045993 A1 | 3/2019 |

OTHER PUBLICATIONS

Kohler et al., "Consistent Network Management for Software-Defined Networking Based Multicast", Oct. 21, 2016, IEEE, IEEE Transactions on Network and Service Management (vol. 13, Issue: 3, 2016, pp. 447-461) (Year: 2016).*

(Continued)

*Primary Examiner* — Davoud A Zand
(74) *Attorney, Agent, or Firm* — Lee & Hayes, P.C.

(57) ABSTRACT

Techniques for extending unicast to multicast service reflection to SD-WAN overlay networks using a virtual interface (VIF) through a centralized policy are described herein. The techniques may include receiving, by a network controller of a SD-WAN, a centralized data policy for unicast to multicast service reflection, transmitting, by the network controller and to a network edge device, the centralized data policy, designating, by the network edge device, a primary replicator to act as a multicast source and replicate packets toward a last hop router (LHR), configuring, on the primary replicator, a VIF usable to translate unicast packets to multicast packets, and applying, by the primary replicator, the centralized data policy on received packets.

20 Claims, 7 Drawing Sheets

(56) References Cited

U.S. PATENT DOCUMENTS

| | | |
|---|---|---|
| 2018/0248713 A1* | 8/2018 | Zanier .................. H04L 12/4633 |
| 2020/0195579 A1 | 6/2020 | Liu et al. |
| 2020/0366593 A1* | 11/2020 | Kaplan ................. H04L 45/308 |
| 2021/0160169 A1 | 5/2021 | Shen |
| 2022/0116312 A1 | 4/2022 | Suryanarayana et al. |
| 2022/0166639 A1 | 5/2022 | Lindem, III et al. |

OTHER PUBLICATIONS

The PCT Search Report and Written Opinion mailed on Nov. 28, 2023 for PCT Application No. PCT/US2023?029946, from PCT Summary, 15 pages.

Patil, et al.. "Adaptive and Flexible SDN-based Multicast for Efficient Data Center Networking," IEEE, Jan. 2015, 14 pages.

\* cited by examiner

400

```
┌─────────────────────────────────────────────────────────────┐
│ RECEIVE, BY A NETWORK CONTROLLER OF A SD-WAN, A CENTRALIZED │
│          POLICY FOR UNICAST TO MULTICAST SERVICE REFLECTION │
│                             402                             │
└─────────────────────────────────────────────────────────────┘
                              │
                              ▼
┌─────────────────────────────────────────────────────────────┐
│ TRANSMIT, BY THE NETWORK CONTROLLER AND TO A NETWORK EDGE   │
│          DEVICE, THE CENTRALIZED DATA POLICY                │
│                             404                             │
└─────────────────────────────────────────────────────────────┘
                              │
                              ▼
┌─────────────────────────────────────────────────────────────┐
│ DESIGNATE, BY THE NETWORK EDGE DEVICE, A PRIMARY REPLICATOR │
│ TO ACT AS A MULTICAST SOURCE AND REPLICATE PACKETS TOWARD A │
│                            LHR                              │
│                             406                             │
└─────────────────────────────────────────────────────────────┘
                              │
                              ▼
┌─────────────────────────────────────────────────────────────┐
│ CONFIGURE, ON THE PRIMARY REPLICATOR, A VIF USABLE TO       │
│          TRANSLATE UNICAST PACKETS TO MULTICAST PACKETS     │
│                             408                             │
└─────────────────────────────────────────────────────────────┘
                              │
                              ▼
┌─────────────────────────────────────────────────────────────┐
│ APPLY, BY THE PRIMARY REPLICATOR, THE CENTRALIZED DATA      │
│           POLICY ON RECEIVED PACKETS                        │
│                             410                             │
└─────────────────────────────────────────────────────────────┘
```

FIG. 4

UNICAST TO MULTICAST SERVICE REFLECTION IN SD-WAN FABRIC

RELATED APPLICATIONS

This application claims priority to U.S. Provisional Patent Application No. 63/397,096, filed on Aug. 11, 2022, the entire contents of which are incorporated herein by reference and for all purposes.

TECHNICAL FIELD

The present disclosure relates generally to the field of computer networking, and more particularly extending unicast to multicast service reflection to a SD-WAN overlay network through a centralized policy.

BACKGROUND

Currently more and more enterprises are using software defined wide area networks (SD-WANs) for their networking needs. The traditional WAN function was to connect users at an enterprise branch to applications hosted on servers in a data center. Typically, MPLS circuits were used to help ensure security and reliable connectivity. However, this approach does not work in a cloud centric world where once an enterprise adopts cloud-based applications in the form of SaaS and IaaS, a traditional WAN architecture experiences an explosion of traffic accessing applications distributed across the globe. Thus, a SD-WAN is used to send traffic directly over the internet from branch locations to trusted cloud-based applications. A SD-WAN is a virtualized network that runs as an overlay on hardware, both physical routers and virtual devices. Centralized controllers oversee the control plane of the SD-WAN fabric, managing provisioning, maintenance, and security for the SD-WAN overlay network.

Additionally, SD-WAN multicast overlay implementation is increasingly used by enterprises to allow a host to send packets to specific groups of destination computing devices, wherein each of these destination computing devices has previously subscribed to the group in order to receive the group communications. For example, a packet originating from a source may be sent to each of multiple computing devices that have subscribed to receive this multicast traffic. A multicast address is designed to enable the delivery of packets to subscribing receivers in various scattered subnetworks. Multicast is much more efficient than unicast or broadcast, and dramatically reduces network traffic by offering a single source of communication to simultaneous multiple recipients. However, not all routers in a network have multicast capabilities, thus, a multicast recipient may not receive communications they subscribe to because multicast traffic will be dropped by routers in a network that are not capable of transmitting multicast traffic.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4 illustrates a flow diagram of an example method for deploying a centralized policy via VIF for unicast to multicast service reflection in a SD-WAN overlay network.

DESCRIPTION OF EXAMPLE EMBODIMENTS

Overview

Figure 1:
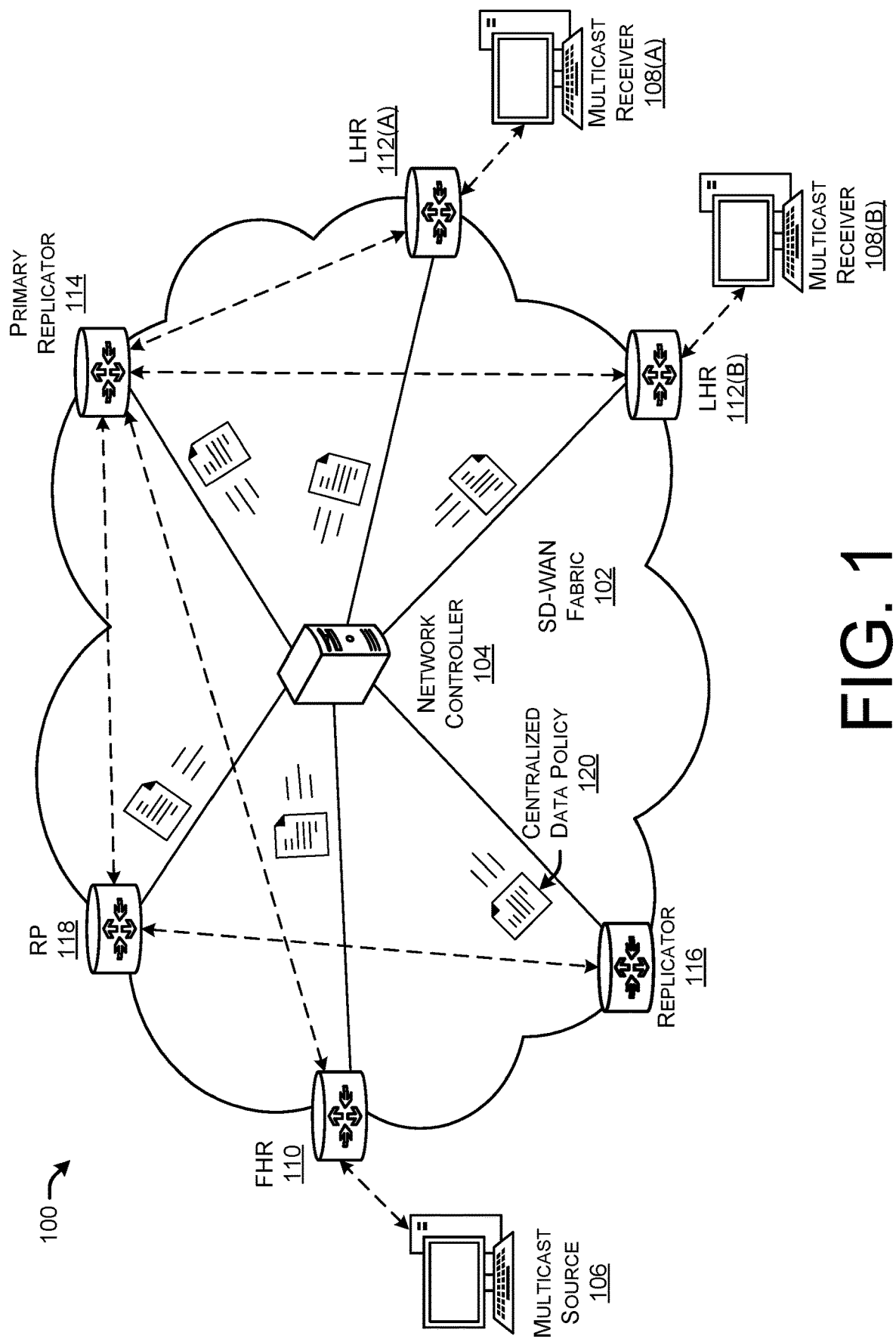
FIG. 1 illustrates a system-architecture diagram of an environment that illustrates unicast to multicast service reflection in a SD-WAN overlay network using VIF through centralized policy.

The present disclosure relates generally to techniques for using hardware-based secure signatures to provide proof of integrity for packets sent through a network for monitoring network data.

A method to perform techniques described herein may include receiving, by a network controller of a SD-WAN, a centralized data policy for unicast to multicast service reflection. Further, the techniques include transmitting, by the network controller and to a network edge device the centralized data policy. The techniques also include designating, by the network edge device, a primary replicator to act as a multicast source and replicate packets towards a last hop router (LHR). Additionally, the techniques include configuring, on the primary replicator, a virtual interface (VIF) usable to translate unicast packets to multicast packets. Finally the techniques include applying, by the primary replicator, the centralized data policy on received packets.

A system to perform techniques described herein may include receiving, by a network controller of a SD-WAN, a centralized data policy for unicast to multicast service reflection. Further, the techniques include transmitting, by the network controller and to a network edge device the centralized data policy. The techniques also include designating, by the network edge device, a primary replicator to act as a multicast source and replicate packets towards a last hop router (LHR). Additionally, the techniques include configuring, on the primary replicator, a virtual interface (VIF) usable to translate unicast packets to multicast packets. Finally the techniques include applying, by the primary replicator, the centralized data policy on received packets.

Additionally, the techniques described herein may be performed by a system and/or device having non-transitory computer-readable media storing computer-executable instructions that, when executed by one or more processors, performs the method described above.

Example Embodiments

In a traditional wide area network (WAN), multicast service reflection provides the capability for users to translate externally received multicast or unicast destination addresses to multicast or unicast addresses that conform to an organization's internal addressing policy. Alternately or in addition, some network device (e.g., routers) do not support multicast. In this situation, multicast packets will be dropped. Thus, unicast to multicast service reflection provides a solution for eliminating multicast packet loss because packets may be forwarded through the network devices that do not support multicast traffic as unicast packets and then later translated to multicast packets. A virtual network interface (VIF) is used for the service reflection in a traditional WAN. When a packet is forwarded to a VIF, it is reflected for translation. The source IP address is changed to the IP address of the virtual interface subnet, which prevents RPF failures. Finally, the destination IP address is translated to a new multicast group IP address. In a traditional WAN each router in the network must be individually programmed to enable unicast to multicast service reflection.

However, as described above more enterprises are using software defined wide area networks (SD-WANs) for their networking needs because a traditional WAN approach does not work in a cloud centric world where once an enterprise adopts cloud-based applications in the form of SaaS and IaaS distributed across the globe. Thus, a SD-WAN is used to send traffic directly over the internet from branch locations to trusted cloud-based applications. A SD-WAN is a virtualized network that runs as an overlay on hardware, both physical routers and virtual devices. Centralized controllers oversee the control plane of the SD-WAN fabric, managing provisioning, maintenance, and security for the SD-WAN overlay network.

This disclosure describes techniques for supporting unicast to multicast service reflection in a SD-WAN overlay network by deploying a centralized data policy to the edge. The centralized data policy may be created by a network administrator and via a centralized network controller. The centralized network controller may dynamically deploy the centralized data policy to the network edge using overlay management protocol (OMP). The edge may compare the system IP in the site list and designate an edge device as a primary replicator. When the primary replicator receives the centralized data policy, it will automatically add a VIF and translation rules. Additionally, the VIF subnet and static route will be advertised to other edge devices via OMP. In this way, unicast to multicast service reflection may be extended to a SD-WAN overlay network by deploying a policy to each network device quickly and efficiently.

To simplify message flow for both any source multicast (ASM) and source specific multicast (SSM), multicast dataflow between a first hop router (FHR) and a primary replicator is replaced with unicast packets. The primary replicator then becomes the source of a multicast tree and, using the translation tables in the centralized policy, converts the unicast packets to multicast packets and replicates dataflow towards last hop routers (LHR) having local receivers subscribing to the multicast group. Since the primary replicator is the source of the multicast tree the IP address of the VIF is the source address for the multicast tree. Additionally, because the primary replicator is the source (best path), there is no need to perform SPT switchover for ASM multicast. In situations where there are multiple replicators, the primary replicator is elected to install the VIF based on system IP or site list. For ASM mode, since the primary replicator will send traffic to a rendezvous point (RP), the RP sends the multicast traffic to any other replicators in the fabric.

In this way, unicast to multicast service reflection can be extended to a SD-WAN fabric. By deploying a centralized data policy, the techniques described herein improve network efficiency and simplify message flow for both ASM and SSM multicast.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an environment 100 in which unicast to multicast service reflection may be extended to a SD-WAN network fabric using VIF through a centralized policy.

In some examples, the environment 100 may include a SD-WAN fabric 102 that includes a centralized network controller 104. In addition, the environment 100 may include devices connected to the SD-WAN fabric such as multicast source 106 and multicast receiver 108(A) and multicast receiver 108(B). Environment 100 may also include a variety of network edge devices (e.g., routers) such as a first hop router (FHR) 110 connected to the multicast source 106, a last hop router (LHR) 112(A) connected to the multicast receiver 108(A) and a LHR 112(B) connected to multicast receiver 108(B). Additionally, environment 100 may also include other edge devices such as an edge device that functions as a primary replicator 114, one or more other edge devices that function as other replicators 116, and an edge device that functions as a rendezvous point (RP) 118.

In addition, the environment 100 includes a centralized data policy 120 that affects data traffic being transmitted between routers on the SD-WAN overlay network. The centralized data policy 120 operates on the data plane in the SD-WAN overlay network and affects how data traffic is sent among SD-WAN devices in the network. The results of the centralized data policy 120 are pushed to the SD-WAN devices (e.g., network devices 110-118 shown in FIG. 1) by the centralized network controller 104 via overlay management protocol (OMP). The centralized data policy 120 is used to deploy unicast to multicast service reflection in the SD-WAN fabric 102. When the primary replicator 114 receives the centralized data policy 120, the primary replicator 114 automatically adds VIF and the unicast to multicast translation rules, enabling unicast to multicast service reflection to be extended in the SD-WAN fabric 102.

To simplify unicast to multicast service reflection message flow in the SD-WAN fabric 102, unicast packets replace multicast packets between the FHR 110 and the primary replicator 114. Thus, the VIF of the primary replicator 114 is the source of the multicast flow and source path tree (SPT) switchover is not necessary in ASM multicast. This process is described in greater detail below with reference to FIG. 2.

To deploy the centralized data policy 120 that enables unicast to multicast service reflection in the SD-WAN fabric 102, the results of the centralized data policy 120 are pushed to the SD-WAN devices (e.g., network devices 110-118 shown in FIG. 1) by the centralized network controller 104 via OMP. A primary replicator 114 is determined based on the system IP or the site-list. The primary replicator 114 then creates a VIF which resides on its own unique subnet that is advertised via OMP to the other network edge devices (e.g., network devices 110-118 of FIG. 1).

Figure 2:
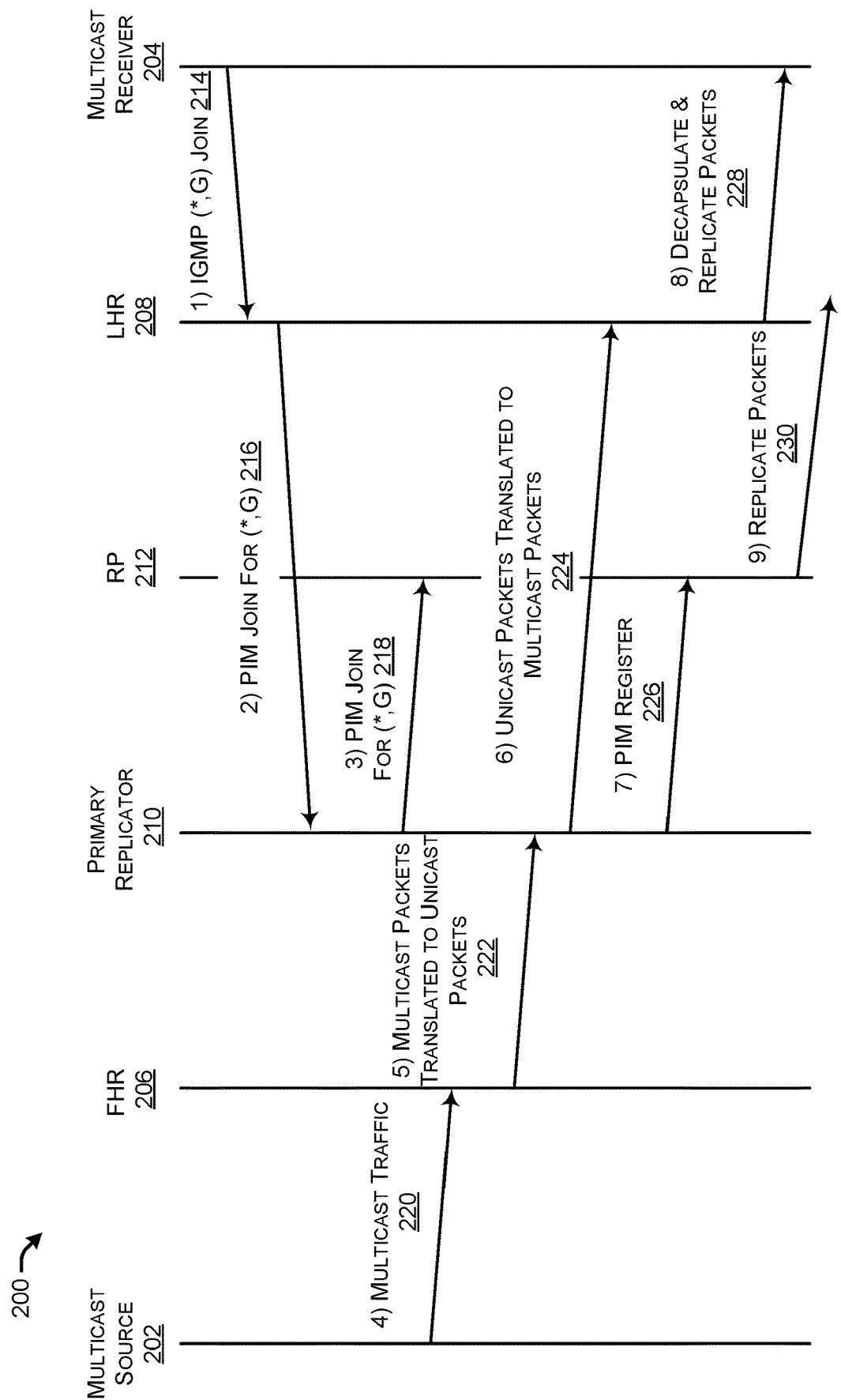
FIG. 2 illustrates an example call flow for unicast to multicast translation for any source multicast (ASM) in a SD-WAN overlay network.

FIG. 2 illustrates an example call flow 200 for unicast to multicast translation for any source multicast (ASM) in the SD-WAN network fabric 102 of FIG. 1. In ASM multicast the multicast receiver does not have the knowledge of the multicast source and can receive multicast traffic from any source, and requires a rendezvous point (RP) to discover new sources in the network. The multicast receiver is only aware of the multicast group that the source and uses internet group management protocol (IGMP) in order to subscribe to receive all the multicast traffic destined for the multicast group address.

As illustrated in FIG. 2, the call flow for extending unicast to multicast service reflection for ASM multicast begins at 1) with the multicast receiver 204 transmitting an IGMP (*, G) join 214 message to the LHR 208 which connects the multicast receiver 204 to a SD-WAN overlay network. For example, in FIG. 1 the multicast receiver 108(A) may send an IGMP (*,G) join message to LHR 112(A).

At 2) the LHR 208 generates and sends a Protocol Independent Multicast (PIM) join for (*,G) 216 to the primary replicator 210. For example, in FIG. 1 the LHR 112(A) sends a PIM join for (*,G) message to the primary replicator 114.

At 3) the primary replicator 210 propagates the PIM join for (*,G) 218 to the RP 212. As an example in FIG. 1, the primary replicator 114 sends the PIM join for (*,G) that was received from the LHR 112(A) to the RP 118.

At 4) a multicast source 202 transmits multicast traffic 220 to the FHR 206 which connects the multicast source 202 to the SD-WAN overlay network. For example, in FIG. 1 the multicast source 106 transmits multicast traffic to the FHR 110 that connects the multicast source 106 to the SD-WAN fabric 102.

At 5) when the FHR 206 receives multicast traffic 220, the FHR 206 checks the translation table of the centralized data policy and translates the multicast packets to unicast packets 222 and sends the unicast packets to the primary replicator 210. For example, in FIG. 1 when the FHR 110 receives multicast packets from the multicast source 106, the FHR 110 determines that the incoming packets are multicast packets, accesses the translation table in the centralized data policy 120 and translates the multicast packets to unicast packets and sends the unicast packets to the primary replicator 114.

At 6) the primary replicator 210 receives the unicast packets 222, checks the translation table in the centralized data policy and converts the packets to multicast packets 224, creates (S,G) with the primary replicator 210 as the source of the multicast tree and replicates flows towards LHR 208. Because the primary replicator 210 is the source of the multicast tree, and the best path, there is no need to perform SPT switchover. For example, in FIG. 1 the primary replicator 114 receives unicast packets from the FHR 110, checks the translation table in the centralized data policy 120 and converts the packets to multicast packets, creates (S,G) with the VIF of the primary replicator 114 as the source IP address of the multicast tree and replicates flows towards LHR 112(A) and LHR 112(B).

Additionally, at 7) the primary replicator 210 sends a PIM register 226 to the RP 212. For example in FIG. 1, the primary replicator 114 sends a PIM register message to the RP 118.

At 8) the LHR 208 decapsulates the SD-WAN header and replicates packets 228 to subscribing multicast receiver(s) 204. For example, in FIG. 1 the LHR 112(A) and LHR 112(B) decapsulate the SD-WAN header and replicates the packets to multicast receiver 108(A) and multicast receiver 108(B) respectively.

Finally, at 9) the RP 212 replicates packet 230 to other replicators in the SD-WAN overlay network. For example in FIG. 1, the RP 118 replicates packets to replicator 116.

Figure 3:
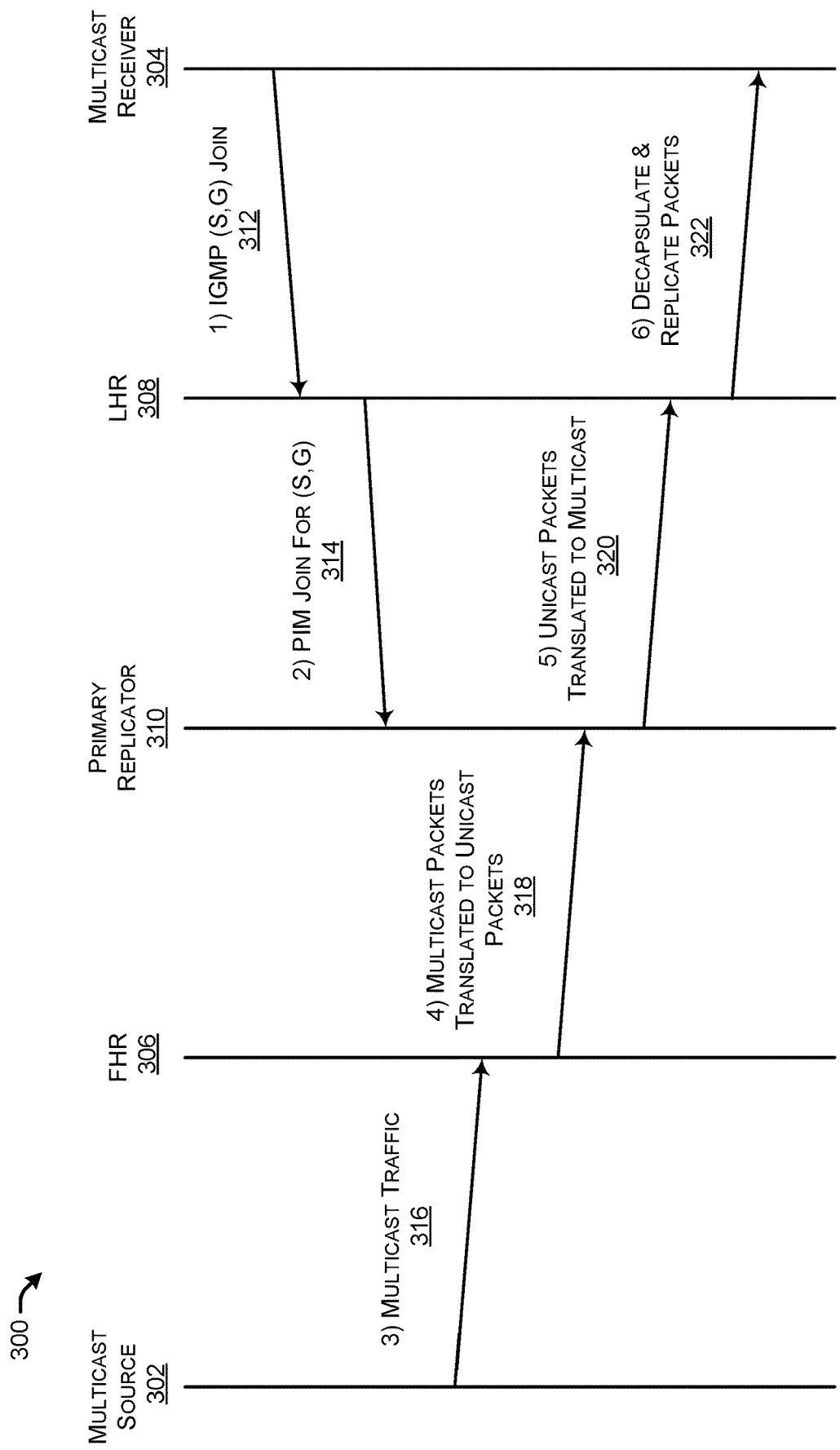
FIG. 3 illustrates an example call flow for unicast to multicast translation for source specific multicast (SSM) in a SD-WAN overlay network.

FIG. 3 illustrates an example call flow 300 for unicast to multicast translation for source specific multicast (SSM) in the SD-WAN network fabric 102 of FIG. 1. In SSM multicast packets that are delivered to a receiver are those originating from a specific source address requested by a multicast receiver resulting in no shared trees. Thus only shortest path trees (SPT) are built towards the source, meaning RPs are not necessary.

As illustrated in FIG. 3, the call flow for extending unicast to multicast service reflection for SSM multicast begins at 1) with the multicast receiver 304 sending an IGMP (S,G) join 312 message to the LHR 308 which connects the multicast receiver 304 to a SD-WAN overlay network. The source specified in the IGMP (S,G) join 312 message is the primary replicator's virtual IP. For example, in FIG. 1 the multicast receiver 108(B) may send an IGMP (S,G) join message to LHR 112(B), where the "source" is the VIF of the primary replicator 114.

At 2) the LHR 308 generates and sends a PIM join for (S,G) 314 to the primary replicator 310. For example, in FIG. 1 the LHR 112(B) sends a PIM join for (S,G) message to the primary replicator 114, where the "source" is the VIF of the primary replicator 114.

At 3) the multicast source 302 transmits multicast traffic 316 to the FHR 306 which connects the multicast source 312 to the SD-WAN overlay network. For example, in FIG. 1, the multicast source 106 transmits multicast traffic to the FHR 110 that connects the multicast source 106 to the SD-WAN fabric 102.

At 4) when the FHR 306 receives multicast traffic 316, the FHR 306 determines that the incoming packets are multicast packet, accesses the translation table in the centralized data policy and translates the multicast packets to unicast packets 318 and sends the unicast packets to the primary replicator 310. For example, in FIG. 1 when the FHR 110 receives multicast packets from the multicast source 106, the FHR 110 checks the translation table in the centralized data policy 120 and translates the multicast packets to unicast packets and sends the unicast packets to the primary replicator 114.

At 5) the primary replicator 310 receives the unicast packets 318, checks the translation table in the centralized data policy and converts the packets to multicast packets 320, keeping the source IP as the VIF of the primary replicator 310. For example, in FIG. 1 the primary replicator 114 receives unicast packets from the FHR 110, checks the translation table in the centralized data policy 120 and converts the packets to multicast packets, keeping the primary replicator as the source of the multicast tree and replicates flows towards LHR 112(B).

At 6) the LHR 308 decapsulates the SD-WAN header and replicates packets 322 to its subscribing multicast receiver(s) 304. For example, in FIG. 1 the LHR 112(B) decapsulates the SD-WAN header and replicates the packets to multicast receiver 108(B).

FIG. 4 illustrates a flow diagram of an example method 400 for applying a centralized data policy for unicast to multicast service reflection. In some instances, the steps of method 400 may be performed by a device that includes one or more processors and one or more non-transitory computer-readable media storing computer-executable instructions that, when executed by the one or more processors, cause the one or more processors to perform operations of method 400.

At operation 402, a network controller of a SD-WAN receives a centralized data policy for unicast to multicast service reflection. For example, a network controller, such as the network controller 104 in FIG. 1, may receive a centralized data policy from a network administrator.

At operation 404, the network controller transmits the centralized data policy to a network edge device. Referring to FIG. 1, the network controller 104 deploys the centralized data policy 120 to network edge devices, such as network devices 110-118 as illustrated.

At operation 406, the network edge device designates a primary replicator to act as a multicast source and replicate packets towards a LHR. For example in FIG. 1, the primary replicator 114 is designated as a primary replicator (not replicator 116). The primary replicator 114 will act as the source of a multicast distribution tree and replicate multicast packet towards LHR 112(A) and LHR 112(B).

At operation 408, the primary replicator configures a VIF usable to translate unicast packets to multicast packets. Once the primary replicator is designated, it will automatically add the VIF. The VIF resides on its own subnet that is advertised via OMP to the other network edge devices.

At operation 410, the primary replicator applies the centralized data policy on received packets. The primary replicator will receive unicast packets from a FHR, the primary replicator checks the translation table in the centralized data policy and converts the unicast packets to multicast packets and replicates flows towards the LHR(s).

Figure 5:
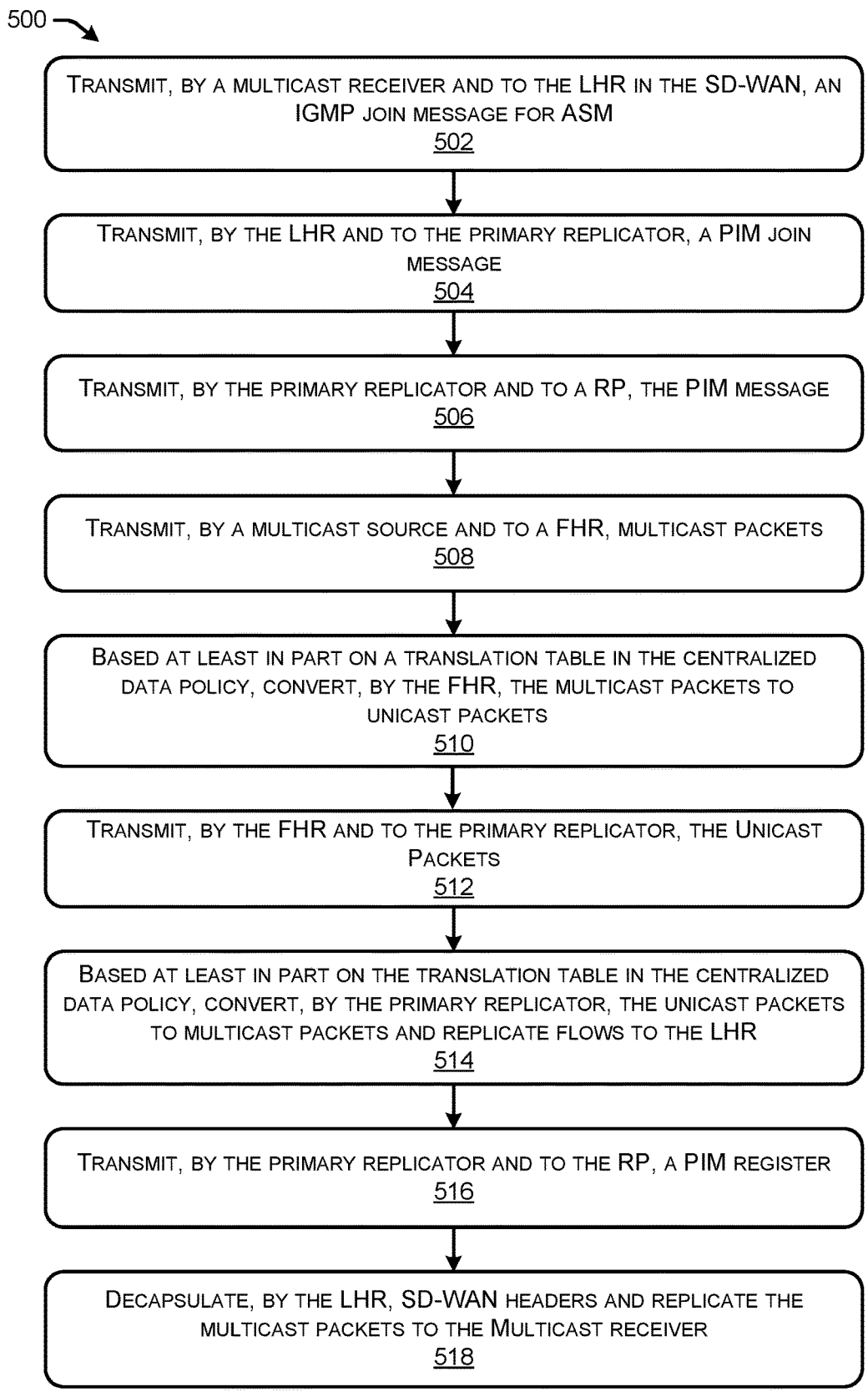
FIG. 5 illustrates a flow diagram of an example method for unicast to multicast translation for ASM in a SD-WAN overlay network.

FIG. 5 illustrates a flow diagram of an example method 500 for a call flow for multicast overlay ASM mode. In some instances, the techniques may be performed by a system (e.g., one or more devices), such as a network controller 104, a multicast source 106, a FHR 110 a multicast receiver 108, a LHR 112, a primary replicator 114, other replicators 116, an RP 118, a combination thereof, and/or any other devices (e.g., hardware offload chips and/or any other device). The techniques of method 500 may be performed by a system that includes one processor, or more than one processor.

At operation 502, a multicast receiver transmits an IGMP join message for ASM to the LHR. For example, in FIG. 1 the multicast receiver 108(A) or multicast receiver 108(B) may send an IGPM (*,G) join message to LHR 112(A) or LHR 112(B) respectively.

At operation 504, the LHR transmits a PIM join message to the primary replicator. For example, in FIG. 1 LHR 112(A) or LHR 112(B) may send a PIM join (*,G) message to the primary replicator 114.

At operation 506, the primary replicator transmits the PIM message to the RP. For example, in FIG. 1 the primary replicator 114 propagates the PIM join for (*,G) that was received from a LHR to the RP 118.

At operation 508, the multicast source transmits a multicast packets to a FHR. For example, in FIG. 1 the multicast source 106 transmits multicast traffic to the FHR 110 in the SD-WAN fabric 102.

At operation 510, the FHR converts the multicast packets to unicast packets based at least in part on a translation table in the centralized data policy. For example, in FIG. 1 when the FHR 110 receives a multicast packet from the multicast source 106, the FHR 110 determines that the incoming packets are multicast packets, accesses the translation table in the centralized data policy 120 and translates the multicast packets to unicast packets and sends the unicast packet to the primary replicator 114.

At operation 512, the FHR transmits the unicast packets to the primary replicator. For example, in FIG. 1 the FHR 110 transmits the unicast packet to the primary replicator 114.

At operation 514, the primary replicator converts the unicast packets to multicast packets and replicates flows to the LHR based at least in part on the translation table in the centralized data policy. For example, in FIG. 1 the primary replicator 114 receives unicast packets from the FHR 110, checks the translation table in the centralized data policy 120 and converts the packets to multicast packets, creates (S,G) with the primary replicator 114 as the source of the multicast tree and replicates flows towards LHR 112(A) and LHR 112(B). Because the primary replicator 114 is the source of the multicast tree, and the best path, there is no need to perform SPT switchover.

At operation 516, the primary replicator transmits a PIM register to the RP. For example, in FIG. 1 the primary replicator 114 transmits a PIM register message to the RP 118.

At operation 518, the LHR decapsulates SD-WAN headers and replicates the multicast packets to the multicast receiver. For example, in FIG. 1 the LHR 112(A) and LHR 112(B) decapsulate the SD-WAN header and replicate the packets to multicast receiver 108(A) and multicast receiver 108(B) respectively.

Figure 6:
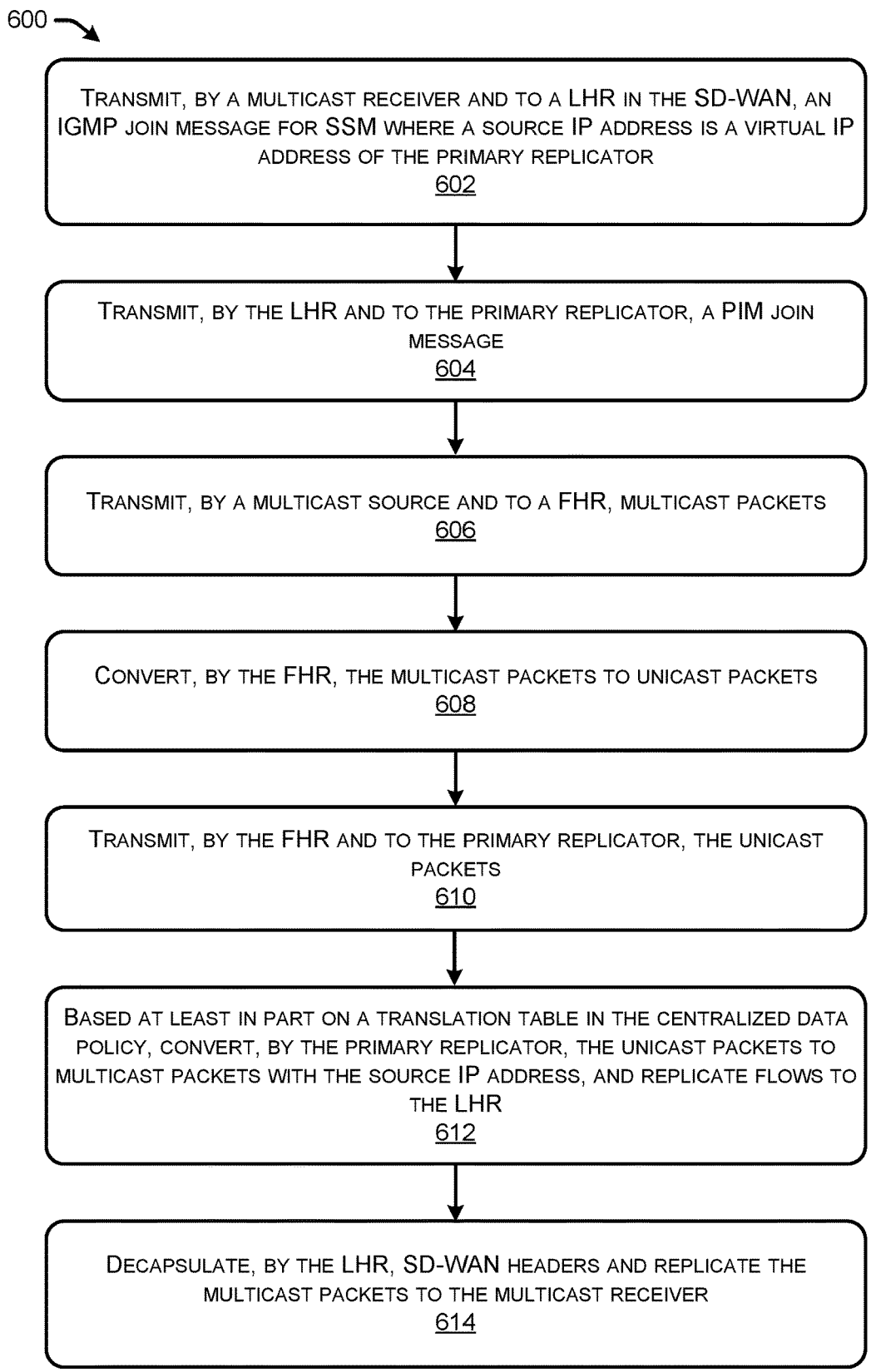
FIG. 6 illustrates a flow diagram of an example method for unicast to multicast translation for SSM in a SD-WAN overlay network.

FIG. 6 illustrates a flow diagram of an example method 600 for a call flow for multicast overlay SSM mode. In some instances, the techniques may be performed by a system (e.g., one or more devices), such as a network controller 104, a multicast source 106, a FHR 110 a multicast receiver 108, a LHR 112, a primary replicator 114, other replicators 116, an RP 118, a combination thereof, and/or any other devices (e.g., hardware offload chips and/or any other device). The techniques of method 600 may be performed by a system that includes one processor, or more than one processor.

At operation 602, a multicast receiver transmits an IGMP join message for SSM where a source IP address is a virtual IP address of the primary replicator, to a LHR in the SD-WAN. For example, in FIG. 1 the multicast receiver 108(A) or the multicast receiver 108(B) may send an IGMP (S,G) join message to LHR 112(A) or LHR 112(B) respectively, where the "source" is the VIP of the primary replicator 114.

At operation 604, the LHR transmits a PIM join message to the primary replicator. For example, in FIG. 1 the LHR 112(A) or LHR 112(B) send a PIM join for (S,G) message to the primary replicator 114, where the source IP address is the VIF of the primary replicator 114.

At operation 606, a multicast source transmits multicast packets to a FHR. For example, in FIG. 1, the multicast source 106 transmits multicast traffic to the FHR 110 that connects the multicast source 106 to the SD-WAN fabric 102.

At operation 608, the FHR converts the multicast packets to unicast packets. For example, in FIG. 1 when the FHR 110 receives multicast packets from the multicast source 106, the FHR 110 checks the translation table in the centralized data policy 120 and translates the multicast packets to unicast packets and sends the unicast packets to the primary replicator 114.

At operation 610, the FHR transmits the unicast packets to the primary replicator. For example, in FIG. 1 the FHR 110 transmits the unicast packets to the primary replicator 114.

At operation 612, the primary replicator converts the unicast packets to multicast packets with the source IP address, based at least in part on a translation table in the centralized data policy, and replicates the flows to the LHR. For example, in FIG. 1 the primary replicator 114 receives the unicast packets from the FHR 110, checks the translation table in the centralized data policy 120 and converts the packets to multicast packets, keeping the primary replicator as the source of the multicast tree and replicates flows towards LHR 112(A) and LHR 112(B).

At operation 614, the LHR decapsulates the SD-WAN headers and replicates the multicast packets to the multicast receiver. For example, in FIG. 1 LHR 112(A) and LHR 112(B) decapsulates the SD-WAN header and replicate the received packets to multicast receiver 108(A) and multicast receiver 108(B) respectively.

Figure 7:
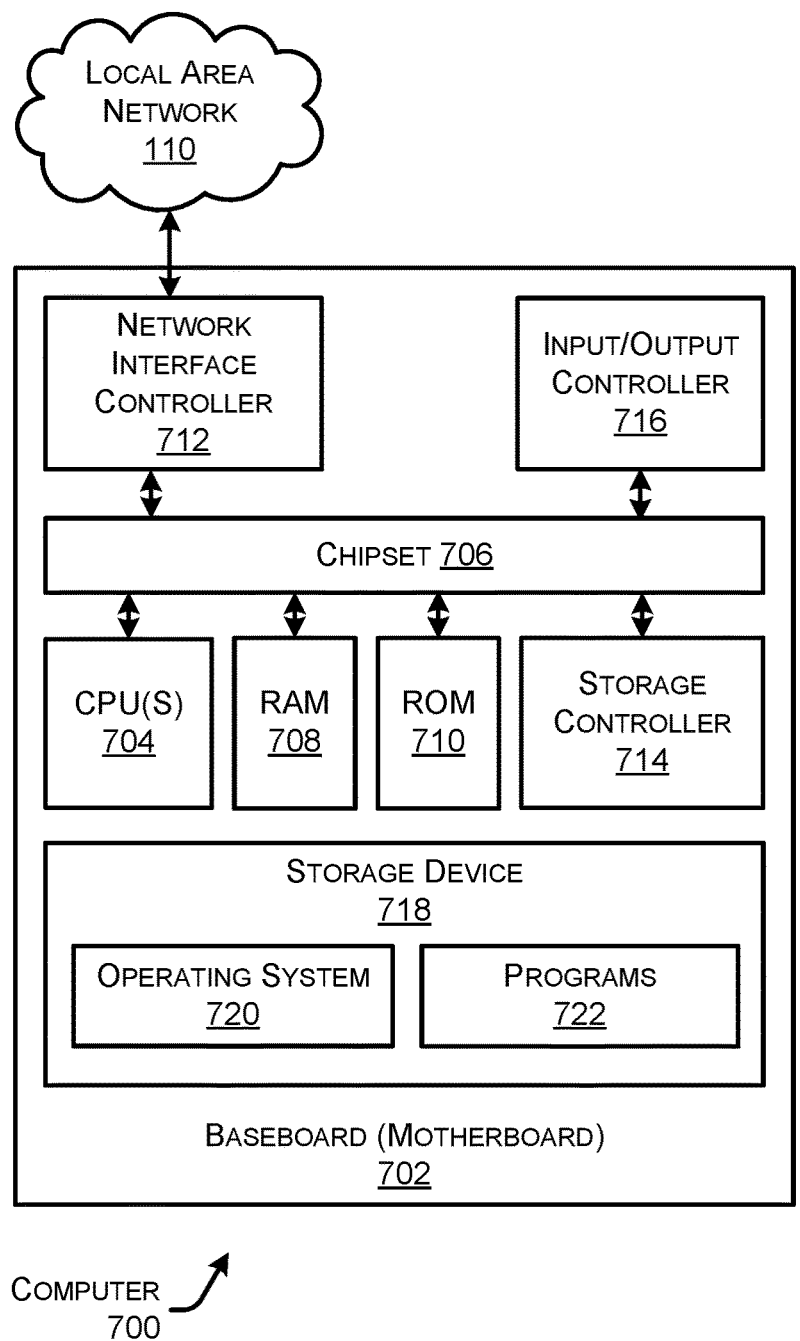
FIG. 7 is a computer architecture diagram showing an illustrative computer hardware architecture for implementing a server device that can be utilized to implement aspects of the various technologies presented herein.

FIG. 7 shows an example computer architecture for a device capable of executing program components for implementing the functionality described above. The computer architecture shown in FIG. 7 illustrates any type of computer 700, such as a conventional server computer, workstation, desktop computer, laptop, tablet, network appliance, e-reader, smartphone, or other computing device, and can be utilized to execute any of the software components presented herein. The computer may, in some examples, correspond to a network controller 104, a multicast source 106, a FHR 110, multicast receiver 108, a LHR 112, a replicator 116 (or 114), and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the SD-WAN 102. The chipset 706 can include functionality for providing network connectivity through a NIC 712, such as a gigabit Ethernet adapter. The NIC 712 is capable of connecting the computer 700 to other computing devices over the SD-WAN 102. It should be appreciated that multiple NICs 712 can be present in the computer 700, connecting the computer to other types of networks and remote computer systems.

The computer 700 can be connected to a storage device 718 that provides non-volatile storage for the computer. The storage device 718 can store an operating system 720, programs 722, and data, which have been described in greater detail herein. The storage device 718 can be connected to the computer 700 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700. In some examples, the operations performed by a network controller 104, a multicast source 106, a FHR 110, multicast receiver 108, a LHR 112, a replicator 116 (or 114), and/or any components included therein, may be supported by one or more devices similar to computer 700. Stated otherwise, some or all of the operations performed by a network controller 104, a multicast source 106, a FHR 110, multicast receiver 108, a LHR 112, a replicator 116 (or 114), and or any components included therein, may be performed by one or more computer devices 700.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 700. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 718 can store other system or application programs and data utilized by the computer 700.

In one embodiment, the storage device 718 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various processes described above with regard to FIGS. 1-6. The computer 700 can also include computer-readable storage media having instructions stored thereupon for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or might utilize an architecture completely different than that shown in FIG. 7.

As described herein, the computer 700 may comprise one or more of the network devices 110-118, the multicast source 106, multicast receiver(s) 108, and/or any other device. The computer 700 may include one or more hardware processors 704 (processors) configured to execute one or more stored instructions. The processor(s) 704 may comprise one or more cores. Further, the computer 700 may include one or more network interfaces configured to provide communications between the computer 700 and other devices, such as the communications described herein as being performed by the network devices 110-118, the multicast source 106, multicast receiver(s) 108, and/or any other device. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 722 may comprise any type of programs or processes to perform the techniques described in this disclosure for extending unicast to multicast service reflection to SD-WAN overlay network using VIF through a centralized policy.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   receiving, by a network edge device and from a network controller of an SD-WAN, a centralized data policy for unicast to multicast service reflection;
   receiving, by the network edge device, an indication that the network edge device corresponds to a primary replicator to act as a multicast source and replicate packets toward a last hop router (LHR);
   configuring, by the primary replicator, a virtual interface (VIF) usable to translate unicast packets to multicast packets;
   receiving, by the primary replicator and from a first hop router (FHR), a unicast packet, wherein the unicast packet is a packet converted from multicast to unicast by the FHR based at least in part on a translation table in the centralized data policy; and
   converting, by the primary replicator, the unicast packet to a multicast packet based at least in part on the translation table in the centralized data policy, such that the LHR can replicate the multicast packet to subscribing multicast receivers.

2. The method of claim 1, further comprising:
   transmitting, by a multicast receiver and to the LHR in the SD-WAN, an Internet Group Management Protocol (IGMP) join message for Any-Source Multicast (ASM);
   transmitting, by the LHR and to the primary replicator, a Protocol Independent Multicast (PIM) join message;
   transmitting, by the primary replicator and to a Rendezvous Point (RP), the PIM join message;
   transmitting, by a multicast source and to a First Hop Router (FHR), multicast packets;
   based at least in part on the translation table in the centralized data policy, converting, by the FHR, the multicast packets to unicast packets;
   transmitting, by the FHR and to the primary replicator, the unicast packets;

based at least in part on the translation table in the centralized data policy, converting, by the primary replicator, the unicast packets to multicast packets and replicate flows to the LHR;

transmitting, by the primary replicator and to the RP, a PIM register; and decapsulating, by the LHR, SD-WAN headers and replicate the multicast packets to the multicast receiver.

3. The method of claim 2 further comprising replicating, by the RP, the multicast packets to other replicators in the SD-WAN.

4. The method of claim 1, further comprising:

transmitting, by a multicast receiver and to a last hop router (LHR) in the SD-WAN, an Internet Group Management Protocol (IGMP) join message for Source-Specific Multicast (SSM) where a source IP address is a virtual IP address of the primary replicator;

transmitting, by the LHR and to the primary replicator, a Protocol Independent Multicast (PIM) join message;

transmitting, by a multicast source and to a First Hop Router (FHR), multicast packets;

converting, by the FHR, the multicast packets to unicast packets;

transmitting, by the FHR and to the primary replicator, the unicast packets;

based at least in part on the translation table in the centralized data policy, converting, by the primary replicator, the unicast packets to multicast packets with the source IP address, and replicate flows to the LHR; and decapsulating, by the LHR, SD-WAN headers and replicate the multicast packets to the multicast receiver.

5. The method of claim 4 wherein converting, by the FHR, the multicast packets to unicast packets further comprises determining that incoming packets are multicast packets, accessing the translation table in the centralized data policy, and translating the multicast packets to unicast packets.

6. The method of claim 1, further comprising multiple replicators in a SD-WAN fabric and wherein a primary replicator installs the VIF based at least in part on system IP or site list.

7. The method of claim 1, further comprising advertising a VIF subnet and static route to other network edge devices via an Overlay Management Protocol (OMP).

8. A system comprising:

one or more processors; and one or more non-transitory computer-readable media storing computer-executable instructions that, when executed by the one or more processors, cause the one or more processors to perform operations comprising:

receiving, by a network edge device and from a network controller of a SD-WAN, a centralized data policy for unicast to multicast service reflection;

receiving, by the network edge device, an indication that the network edge device corresponds to a primary replicator to act as a multicast source and replicate packets toward a last hop router (LHR);

configuring, by the primary replicator, a virtual interface (VIF) usable to translate unicast packets to multicast packets;

receiving, by the primary replicator and from a first hop router (FHR), a unicast packet, wherein the unicast packet is a packet converted from multicast to unicast by the FHR based at least in part on a translation table in the centralized data policy; and converting, by the primary replicator, the unicast packet to a multicast packet based at least in part on the translation table in the centralized data policy, such that the LHR can replicate the multicast packet to subscribing multicast receivers.

9. The system of claim 8, the operations further comprising:

transmitting, by a multicast receiver and to a last hop router (LHR) in the SD-WAN, an Internet Group Management Protocol (IGMP) join message for Any-Source Multicast (ASM);

transmitting, by the LHR and to the primary replicator, a Protocol Independent Multicast (PIM) join message;

transmitting, by the primary replicator and to a Rendezvous Point (RP), the PIM join message;

transmitting, by a multicast source and to a First Hop Router (FHR), multicast packets;

based at least in part of the translation table in the centralized data policy, converting, by the FHR, the multicast packets to unicast packets;

transmitting, by the FHR and to the primary replicator, the unicast packets;

based at least in part on the translation table in the centralized data policy, converting, by the primary replicator, the unicast packets to multicast packets and replicate flows to the LHR;

transmitting, by the primary replicator and to the RP, a PIM register; and decapsulating, by the LHR, SD-WAN headers and replicate the multicast packets to the multicast receiver.

10. The system of claim 9 the operations further comprising replicating, by the RP, the multicast packets to other replicators in the SD-WAN.

11. The system of claim 8, the operations further comprising:

transmitting, by a multicast receiver and to a last hop router (LHR) in the SD-WAN, an Internet Group Management Protocol (IGMP) join message for Source-Specific Multicast (SSM) where a source IP address is a virtual IP address of the primary replicator;

transmitting, by the LHR and to the primary replicator, a Protocol Independent Multicast (PIM) join message;

transmitting, by a multicast source and to a First Hop Router (FHR), multicast packets;

converting, by the FHR, the multicast packets to unicast packets;

transmitting, by the FHR and to the primary replicator, the unicast packets;

based at least in part on the translation table in the centralized data policy, converting, by the primary replicator, the unicast packets to multicast packets with the source IP address, and replicate flows to the LHR; and decapsulating, by the LHR, SD-WAN headers and replicate the multicast packets to the multicast receiver.

12. The system of claim 11 wherein converting, by the FHR, the multicast packets to unicast packets further comprises determining that incoming packets are multicast packets, accessing the translation table in the centralized data policy, and translating the multicast packets to unicast packets.

13. The system of claim 8, wherein the network edge device designates the primary replicator based at least in part on system IP or site list.

14. The system of claim 8, the operations further comprising advertising a VIF subnet and static route to other network edge devices via an Overlay Management Protocol (OMP).

15. One or more non-transitory computer-readable media storing instructions that, when executed, cause one or more processors to perform operations comprising:
- receiving, by a network edge device and from a network controller of an SD-WAN, a centralized data policy for unicast to multicast service reflection;
- receiving, by the network edge device, an indication that the network edge device corresponds to a primary replicator to act as a multicast source and replicate packets toward a last hop router (LHR);
- configuring, by the primary replicator, a virtual interface (VIF) usable to translate unicast packets to multicast packets;
- receiving, by the primary replicator and from a first hop router (FHR), a unicast packet, wherein the unicast packet is a packet converted from multicast to unicast by the FHR based at least in part on a translation table in the centralized data policy; and
- converting, by the primary replicator, the unicast packet to a multicast packet based at least in part on the translation table in the centralized data policy, such that the LHR can replicate the multicast packet to subscribing multicast receivers.

16. The one or more non-transitory computer-readable media of claim 15, the operations further comprising:
- transmitting, by a multicast receiver and to a last hop router (LHR) in the SD-WAN, an Internet Group Management Protocol (IGMP) join message for Any-Source Multicast (ASM);
- transmitting, by the LHR and to the primary replicator, a Protocol Independent Multicast (PIM) join message;
- transmitting, by the primary replicator and to a Rendezvous Point (RP), the PIM join message;
- transmitting, by a multicast source and to a First Hop Router (FHR), multicast packets;
- based at least in part on the translation table in the centralized data policy converting, by the FHR, the multicast packets to unicast packets;
- transmitting, by the FHR and to the primary replicator, the unicast packets;
- based at least in part on the translation table in the centralized data policy, converting, by the primary replicator, the unicast packets to multicast packets and replicate flows to the LHR;
- transmitting, by the primary replicator and to the RP, a PIM register; and
- decapsulating, by the LHR, SD-WAN headers and replicate the multicast packets to the multicast receiver.

17. The one or more non-transitory computer-readable media of claim 16, the operations further comprising replicating, by the RP, the multicast packets to other replicators in the SD-WAN.

18. The one or more non-transitory computer-readable media of claim 15, the operations further comprising:
- transmitting, by a multicast receiver and to a last hop router (LHR) in the SD-WAN, an Internet Group Management Protocol (IGMP) join message for Source-Specific Multicast (SSM) where a source IP address is a virtual IP address of the primary replicator;
- transmitting, by the LHR and to the primary replicator, a Protocol Independent Multicast (PIM) join message;
- transmitting, by a multicast source and to a First Hop Router (FHR), multicast packets;
- converting, by the FHR, the multicast packets to unicast packets;
- transmitting, by the FHR and to the primary replicator, the unicast packets;
- based at least in part on the translation table in the centralized data policy, converting, by the primary replicator, the unicast packets to multicast packets with the source IP address, and replicate flows to the LHR; and
- decapsulating, by the LHR, SD-WAN headers and replicate the multicast packets to the multicast receiver.

19. The one or more non-transitory computer-readable media of claim 18, the operations further comprising converting, by the FHR, the multicast packets to unicast packets by determining that incoming packets are multicast packets, accessing a translation table in the centralized data policy, and translating the multicast packets to unicast packets.

20. The one or more non-transitory computer-readable media of claim 15, the operations further comprising multiple replicators is a SD-WAN fabric and wherein a primary replicator installs the VIF based at least in part on system IP or site list.

* * * * *